Dec. 27, 1932.  H. H. SPRAGUE  1,892,520
GAS METER
Filed Jan. 4, 1929
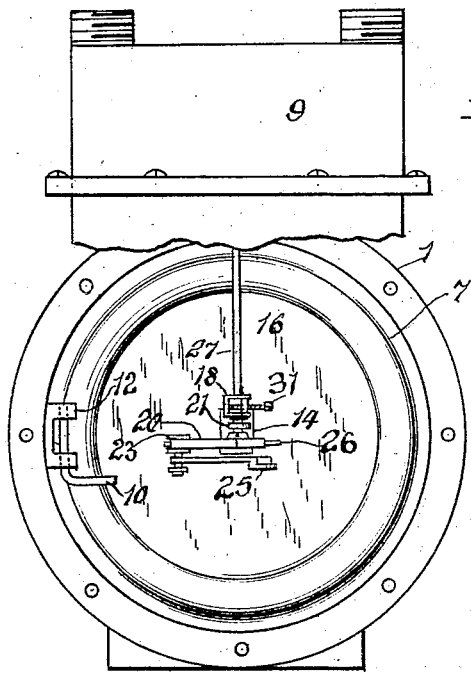
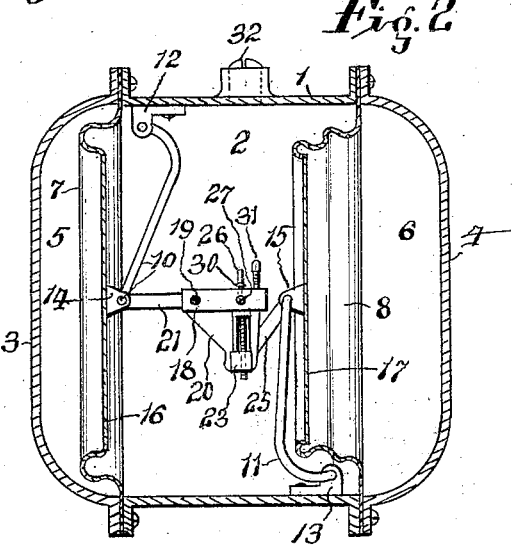
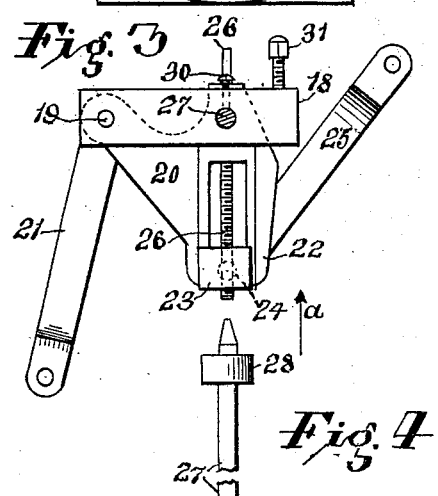
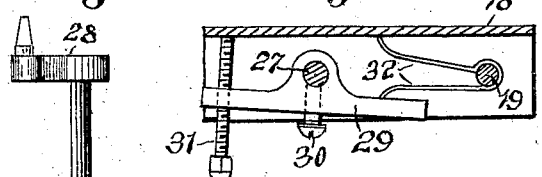
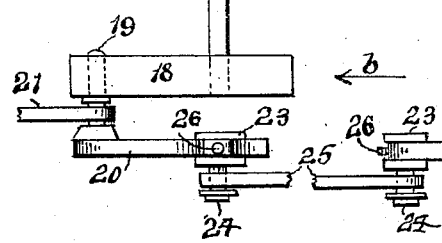
INVENTOR
Henry H. Sprague.
BY
Geo. D. Phillips,  ATTORNEY Patented Dec. 27, 1932

1,892,520

UNITED STATES PATENT OFFICE

HENRY H. SPRAGUE, OF BRIDGEPORT, CONNECTICUT, ASSIGNOR TO THE SPRAGUE METER COMPANY, OF BRIDGEPORT, CONNECTICUT

GAS METER

Application filed January 4, 1929. Serial No. 330,224.

My invention relates to gas meters, being an improvement on my patent of February 11, 1919, No. 1,293,965. The object of the present invention is to reduce and simplify the adjustable operative elements to make the diaphragm displacement accurately correspond with the quantity indicated by the meter index, and also to more effectually synchronize the diaphragm movements with the opening and closing of the valves.

In describing the invention in detail, reference will be had to the accompanying drawing wherein like characters of reference denote corresponding parts in the several views in which Figure 1 represents a front elevation of a meter with one of the side covers removed—

Figure 2 is a central sectional plan view of the body of the meter and side covers and sectional view of the crank shaft—

Figure 3 is an enlarged plan view of the operative mechanism for adjusting the diaphragm and crank shaft and sectional view of said shaft—

Figure 4 is an enlarged elevation looking in the direction of arrow $a$, Figure 3, showing the crank shaft and diaphragm links broken—

Figure 5 is an enlarged elevation looking in the direction of arrow $b$, of Figure 4—

Figure 6 is an enlarged view partly in section of the crank shaft support on line $c$—$c$ of Figure 8—

Figure 7 is an enlarged plan view of the crank shaft adjusting lever, and

Figure 8 is an enlarged end view of the crank shaft support and broken view of the crank shaft.

The conventional elements of the meter comprise, in part, the body 1 having the gas measuring chamber 2, side covers 3 and 4 with their gas measuring chambers 5 and 6, and the flexible diaphragms 7 and 8. The usual cover 9 encloses the gas distributing chamber and valves, not shown. The usual diaphragm supporting levers 10 and 11 are pivoted in the brackets 12 and 13 of the body 1, and also to the brackets 14 and 15 secured to the diaphragm metal plates 16 and 17.

18 is a support anchored at one end to the stud 19 secured to an arm of the crank plate 20, Figures 4 and 5. The diaphragm link 21 is pivoted to the stud 19 and also to the bracket 14. The forked arms 22 of the crank plate carry the usual sliding block 23 having the depending stud 24 on which is pivoted the other diaphragm link 25 whose outer end is pivotally supported in the bracket 15. The block 23 is adjusted back and forth on the crank plate by the screw 26 to lengthen or shorten the travel of the diaphragm 8 and thus regulate the displacement of the diaphragm attached to the stud 24 by the link 25. The diaphragm displacement mechanism directly associated with the diaphragm 8 comprise the elements 20, 23, and 25. The support 18 is anchored to a part of the diaphragm mechanism and it carries the elements for adjusting the crank shaft independently of the diaphragm mechanism.

The gist of the invention resides entirely in the support 18 and its relations with the conventional crank shaft 27 and its crank 28 adapted to operatively connect with the meter gas valves, not shown. The crank shaft 27 is journaled in the support 18 and is secured to the rocking lever 29 by the screw 30. This lever carries the screw 31 whose inner end is normally held against the support 18 by the spring 32 mounted on the stud 19. By means of the screw 31 and its connection with the rocking lever 29, the crank 28 is laterally adjusted in the support 18 sufficient to synchronize the opening and closing movements of the meter valves with the diaphragm movements. All of the above adjustments can be made from the outside of the meter by simply removing the screw 32, Figure 2, and insert the proper tools.

From the foregoing description it will readily be seen that the diaphragm and valve adjustments are made by means of few simple and efficient mechanical elements.

Having thus described my invention what I claim is:—

In a gas meter of the character described, comprising in combination, flexible diaphragms, a crank plate, a stud mounted thereon, a link journaled on the stud and also to one of the diaphragms, a member, means adjustably mounting said member on the crank plate, a link connecting said member with the other of said diaphragms, a crank shaft adapted to be operatively connected with valves, a support anchored to the before mentioned stud, one end of the crank shaft being journaled in said support, a lever secured to the crank shaft, an adjusting screw carried by the lever and in contact with the support to effect a rotation of the crank shaft, and a spring for maintaining the crank shaft in any of its adjusted positions.

In testimony whereof I affix my signature.

HENRY H. SPRAGUE.